(12) United States Patent
Yoshida

(10) Patent No.: US 6,378,423 B1
(45) Date of Patent: Apr. 30, 2002

(54) FRICTION DRIVE SYSTEM FLOOR CONVEYOR

(75) Inventor: Yutaka Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 45 days.

(21) Appl. No.: 09/659,155

(22) Filed: Sep. 11, 2000

(30) Foreign Application Priority Data

Sep. 21, 1999 (JP) .......................................... 11-267690

(51) Int. Cl.[7] .............................................. B65G 47/80
(52) U.S. Cl. .................................. 101/163; 198/867.13
(58) Field of Search ........................... 198/779, 781.04, 198/788, 789, 722, 867.13; 104/163

(56) References Cited

U.S. PATENT DOCUMENTS

| | | | | |
|---|---|---|---|---|
| 3,610,391 A | * | 10/1971 | Beck | 198/167 |
| 3,662,905 A | * | 5/1972 | Mizuno et al. | 214/16.1 CD |
| 3,881,589 A | * | 5/1975 | Peddinghaus | 198/127 R |
| 4,003,329 A | * | 1/1977 | Robinson | 114/242 |
| 4,133,267 A | * | 1/1979 | Farkas | 105/29 R |
| 4,399,904 A | * | 8/1983 | Canziani | 198/365 |
| 4,530,287 A | * | 7/1985 | Sticht | 104/168 |
| 4,664,252 A | * | 5/1987 | Galbraith | 198/722 |
| 4,765,273 A | * | 8/1988 | Anderle | 118/729 |
| 5,016,542 A | * | 5/1991 | Mitchell | 104/130 |
| 5,080,220 A | * | 1/1992 | DiFalco | 198/782 |
| 5,222,587 A | * | 6/1993 | Chevalier et al. | 198/465.1 |
| 5,372,240 A | * | 12/1994 | Weskamp | 198/465.1 |
| 5,941,366 A | * | 8/1999 | Quinlan et al. | 198/465.1 |
| 6,158,572 A | * | 12/2000 | Butler et al. | 198/624 |
| 6,269,941 B1 | * | 8/2001 | Ueno | 198/782 |

* cited by examiner

Primary Examiner—Christopher P. Ellis
Assistant Examiner—Rashmi K Sharma
(74) Attorney, Agent, or Firm—Howson & Howson

(57) ABSTRACT

A friction drive system floor conveyor includes a tubular guide rail laid along a conveyor line, a tubular support rail laid directly above, and disposed in parallel relation to, the tubular guide rail, multiple inverted J-shaped carriers having rollers pivoted freely at their upper ends for engagement with the upper side of the support rail, and a pair of guide rollers freely pivoted at the lower end to engage opposite sides of the guide rail, a driven bar linking bases of the carriers, a carriage support bracket installed upright on the driven bar, and a friction drive disposed along the conveyor line. The friction drive system floor conveyor achieves a stable conveyance with low noise, and without roll or rattling while conveying heavy materials or articles, simplifies system construction, and facilitates system maintenance.

3 Claims, 4 Drawing Sheets

FRICTION DRIVE SYSTEM FLOOR CONVEYOR

BACKGROUND OF THE INVENTION

1. Field of the Invention

The present invention relates to a floor conveyor that conveys a carriage with a conveyed article or material mounted on it, and more specifically to a floor conveyor for use, in an automobile manufacturing line or the like, to convey on a floor conveyed material or articles such as car assembly parts to various processes such as a welding process, assembling process, etc.

2. Description of the Related Art

Various different floor conveyor systems have been used in the past for conveying carriages with a conveyed materials. One typical type of conveyor is a floor chain conveyor that conveys a carriage by driving circulating conveyor chains with multiple conveyor carriers linked to the chains. Another is a mobile carriage that travels on wheels on the work floor by means of a power feeding driving means.

The conventional floor conveyor systems mentioned above involve the several problems. In the conventional floor chain conveyor, a drive means such as a chain feeder or the like is used which makes the system construction large and complicated. Moreover, the sliding of the conveyor chains on a conveyor guide rail is apt to create noise. Further, since the center of gravity of the conveyor and its load in combination is relatively high when heavy conveyed materials or objects are loaded on the upper part of the conveyor, the floor chain conveyor tends to exhibit roll vibration, that is the conveyor and its load may oscillate rotationally right and left about an axis extending in the direction of conveyor movement. Further, maintenance work such as the periodic oiling of the conveyor chains, the individual removal of conveyor carriers, etc., is a nuisance, which presents another problem to be solved.

Also, in the conventional floor mobile carriage, since a collector terminal is used to feed power to the drive motor that drives the wheels of the carriage, sliding abrasion is created on the collector terminal during conveyance, and the sliding stirs up dust which adheres to the conveyed material to create spots thereon which require further processing. This is a serious disadvantage. Moreover, since the feeder line has to be laid through the total length of the rail, the laying cost is burdensome and is a problem to be solved.

The present invention addresses the aforementioned disadvantages of conventional conveyor systems, and it is an object of the invention to provide a friction drive system floor conveyor that securely conveys heavy conveyed materials with low noise and without rolling, in a stable stale, simplifies system construction, and facilitates maintenance work.

SUMMARY OF THE INVENTION

To achieve the foregoing object, the friction drive system floor conveyor in accordance with one aspect of the invention is provided with a tubular guide rail laid along a conveyor line and a tubular support rail laid directly above the tubular guide rail in parallel therewith. Multiple inverted J-shaped carriers are provided, having support rollers freely pivoted to their upper ends. These support rollers ride on the top side of the tubular support rail in the longitudinal direction thereof. A pair of guide rollers is also provided. The guide rollers are pivoted to the lower end of the inverted J-shaped carrier, and embrace both the sides of the tubular guide rail. Driven bars mutually link the bases of the inverted J-shaped carriers, and are disposed between the tubular guide rail and the tubular support rail. A carriage support bracket is installed upright to the driven bar to support a carriage above the floor of the conveyor line. A friction drive means disposed along the conveyor line, engages the driven bar on both sides thereof, to move the conveyor in the conveying direction.

In one preferred form of the friction drive system floor conveyor, the friction drive means comprises a friction roller that engages one side of the driven bar to convey the driven bar in the conveyance direction, and a passive roller that comes in contact with the other side of the driven bar to guide the driven bar in the conveyance direction.

Generally the entire conveyor is exposed on the floor, in view of the need for maintenance work on the conveyor. However, from the consideration of the working environment along the conveyor line, it is also possible to adopt a double flooring structure and construct the friction drive system floor conveyor in a form such that only the upper parts of the carriage support brackets are exposed above the upper floor.

Further, in the friction drive system floor conveyor of the invention, the carriage supported on the upper end of the carriage support bracket may take any form, as long as it is able to carry a conveyed material or article. Thus, the carriage may be in the form of a stand, plate, frame, basket, tray, etc. depending on the form and structure, etc. of the conveyed material or article.

Also, the tubular guide rail and the tubular support rail may be any tubular rails, as long as the material thereof has the characteristics of light weight and strength, and this kind of rail material will achieve the most suitable layout along the conveyor line.

Further, with regard to the configuration of the driven bar and the friction drive means, as long as the friction drive means can securely engage the driven bar and move the driven bar in the conveying direction, the mutually engaging surfaces can be concave and convex respectively, or flat. For efficient power transmission to the driven bars, it is preferable that the side faces of the driven bar be flat and that the faces of the friction drive means be in the form of circular cylinders, so that line contact is achieved between the friction drive means and the driven bars.

Further, with regard to the layout of the friction drive means in the friction drive system floor conveyor of the invention, from the consideration of simplifying the system construction, the friction drive means are not required to be laid out in one-to-one correspondence with the driven bars, and it is especially preferable that the friction drive means be concentrated where the greatest conveyance power is needed, such as a carrying-in area, curved corner, and carrying-out area, etc. in the conveyor line.

The friction drive system floor conveyor of the invention thus constructed exhibits the following functions.

The friction drive system floor conveyor includes the driven bar and the friction drive means, and the friction drive means engages both sides of the driven bar to move the driven bar in the conveying direction. This generates a conveying force by the friction exerted between the drive means and the bar. Thus, the friction drive system floor conveyor exhibits a so-called friction drive function.

Further, since the friction drive system floor conveyor is provided with a large number of inverted J-shaped carriers with free rollers pivoted on the upper ends uhereof and a tubular support rail, the free rollers pivoted to the inverted J-shaped carriers roll smoothly on, and in line contact with, the tubular support rail in the longitudinal direction thereof. This suppresses contact noises which are otherwise likely to be generated at the location at which the conveyor is supported. Thus, the friction drive system floor conveyor also exhibits a so-called contact noise suppressing function.

Further, since the tubular guide rail and the pairs of guide rollers are disposed under the position at which the driven bar is held, even if a rolling moment is exerted to the right or left by a conveyed material having a high center of gravity or by an especially heavy conveyed material, the tubular guide rail and the guide rollers securely maintain the inverted J-shaped carrier in an upright attitude, preventing right or left rolling motion of the carriage. Thus, the friction drive system floor conveyor also exhibits a so-called roll prevention function.

Since the driven bars mutually link the bases of the inverted J-shaped carriers, even though the driven bar is straight, it can smoothly follow the locus of the arc at the curved corners of a conveyor line, both ends of the driven bar being suspended, and the bar forming a chord. Thus, the friction drive system floor conveyor exhibits a so-called arc line following function.

Finally, since the friction roller engages one side of the driven bar to drive the bar in the conveying direction, and the passive roller engages the other side of the driven bar to guide it, and the two rollers embrace the bar on both sides, the conveying force is transmitted smoothly to the bar by the friction roller without loss. Thus, the friction drive system floor conveyor also displays a so-called conveyance force loss prevention function.

DETAILED DESCRIPTION OF THE PREFERRED EMBODIMENT

A friction drive system floor conveyor according to one preferred embodiment of the invention will be described with reference to the accompanying drawings, in which the conveyor is employed to convey, on a floor, a conveyed material such as car assembly parts, etc. to an assembly process.

Figure 1:
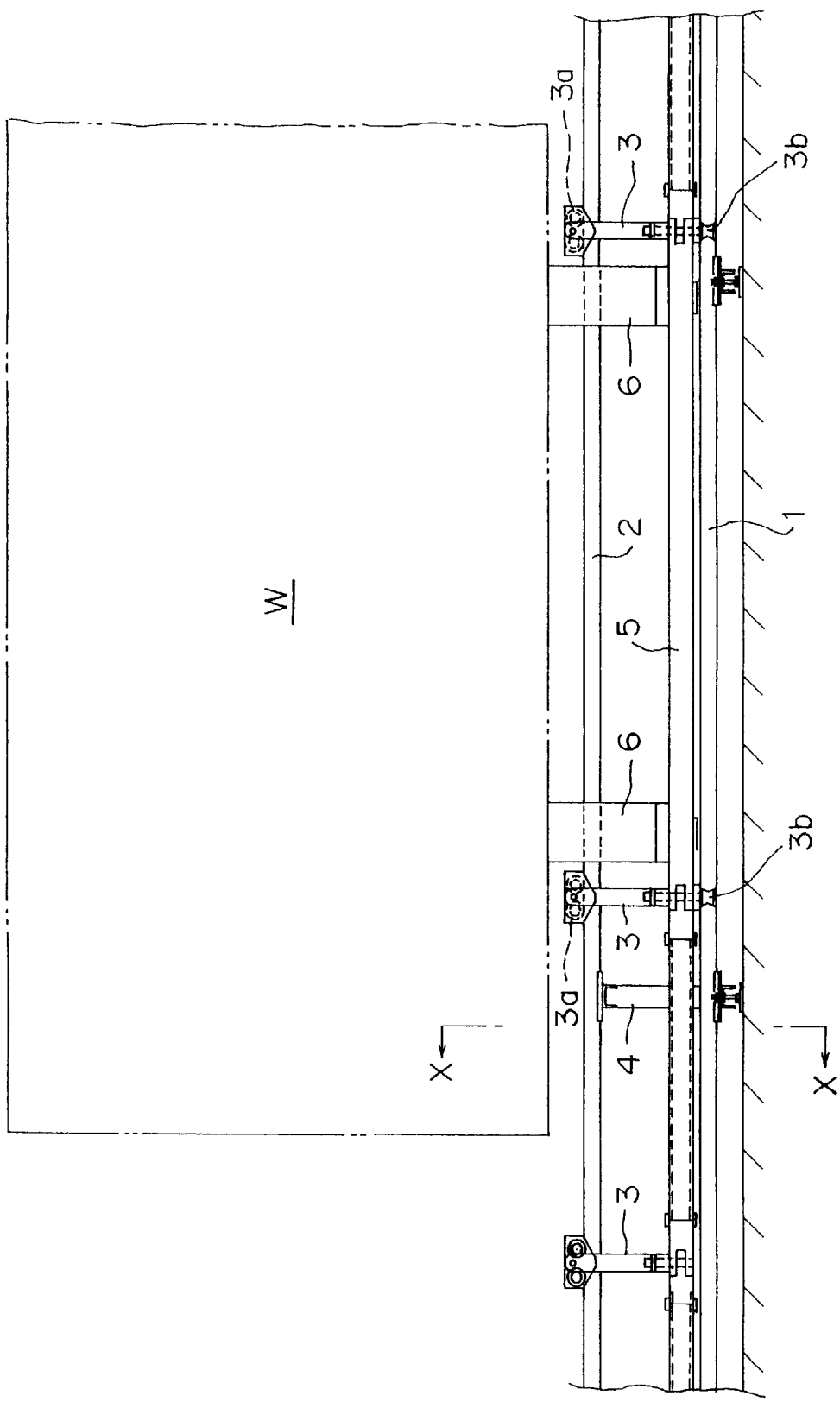
FIG. 1 is a diagrammatic view showing the general construction f a friction drive system floor conveyor according to one embodiment of the invention.
Figure 2:
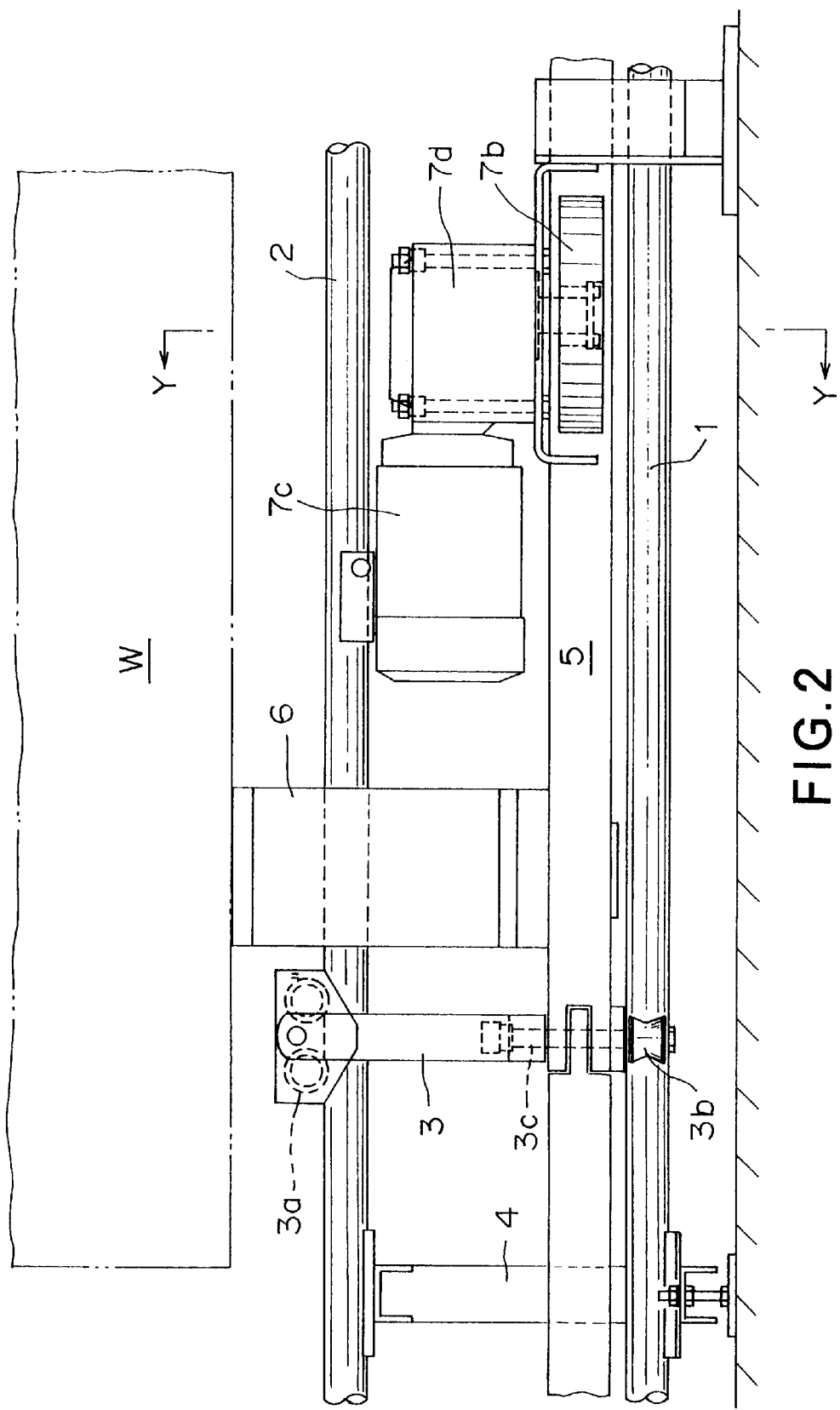
FIG. 2 is an elevational view of a section of the conveyor, showing operation of the friction drive.
Figure 3:
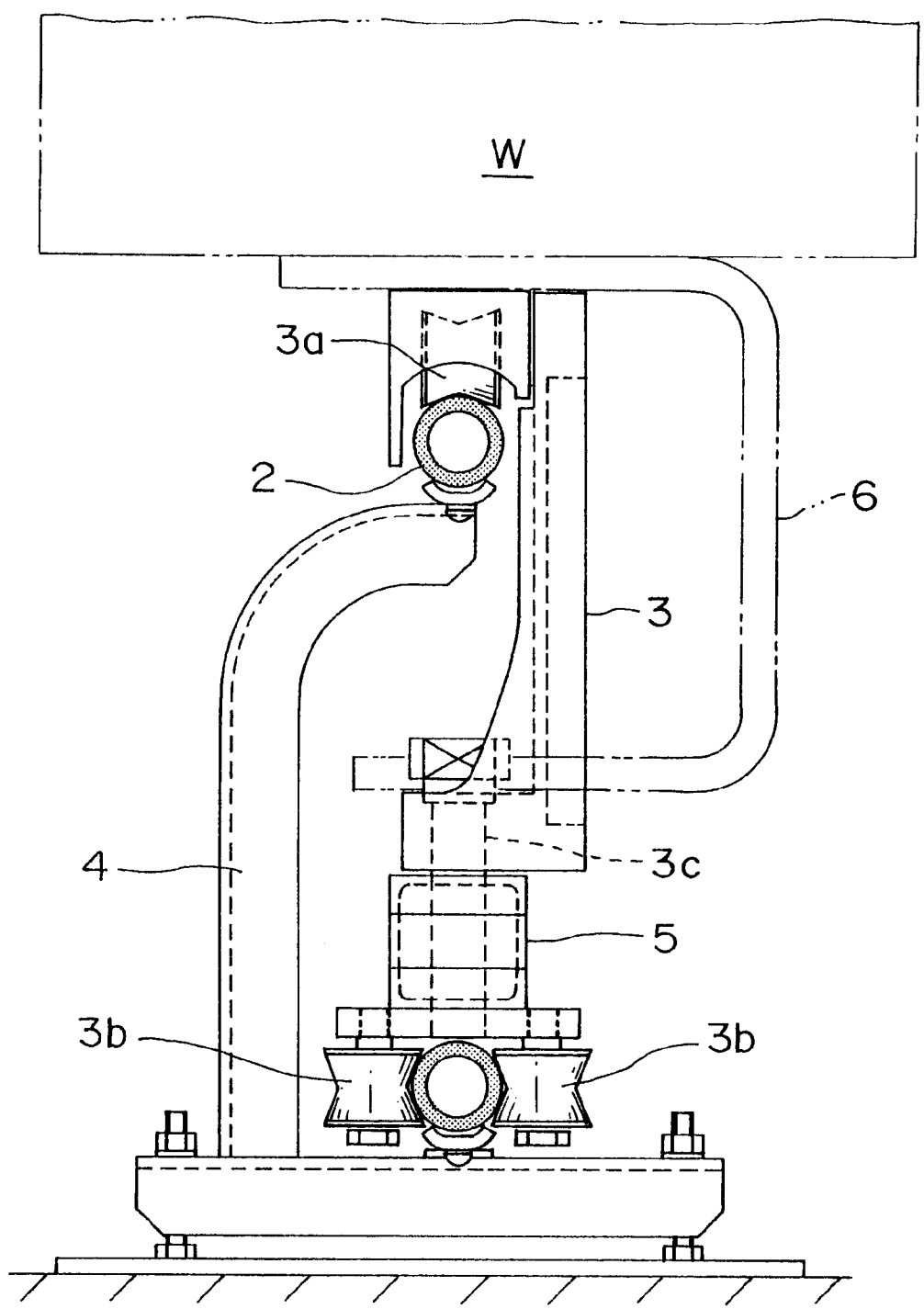
FIG. 3 is a sectional view taken on plane X—X in FIG. 1.

As shown in FIG. 1, the friction drive system floor conveyor includes a conveyor railway section which is composed of a tubular guide rail 1, laid along the conveyor line and a tubular support rail 2 laid directly above, and in parallel relation to, the guide rail 1.

The conveyor further includes multiple inverted J-shaped carriers 3 hung on tubular support rail 2. The support rail 2 is engaged by a roller 3a pivoted to rotate freely on the upper end of the inverted J-shaped carrier 3. The roller 3a rolls on the upper side of the support rail 2 in the longitudinal direction, i.e. in the direction of the length of the support rail. The underside of the tubular support rail is supported by a large number of fixed legs 4, fastened to the floor of the conveyor line at specific intervals. The legs 4 have curved sections disposed toward one side of the conveyor line so that a large number of inverted J-shaped carriers 3 can move longitudinally along the support rail.

A pair of guide rollers 3b face each other and are pivoted for free rotation on the lower end of the inverted J-shaped carrier 3. These guide rollers engage both sides of the tubular guide rail 1, holding the lower ends of the J-shaped carriers against transverse movement relative to the guide rail 1 while permitting the carriers to move longitudinally.

The carriers are linked together by driven bars 5, which are hung on the bases of the carriers just above the lower ends of the carriers. The driven bars 5 are linked with adjoining driven bars on linkage shafts 3c installed on the bases of the carriers. The train of linked driven bars 5 is free to bend about the linkage shafts 3c. However, at those locations along the conveyor line at which the tubular guide rails 1 and the tubular support rails 2 are straight, the driven bars will be located between, and in parallel with, the guide rails and the support rails.

Figure 4:
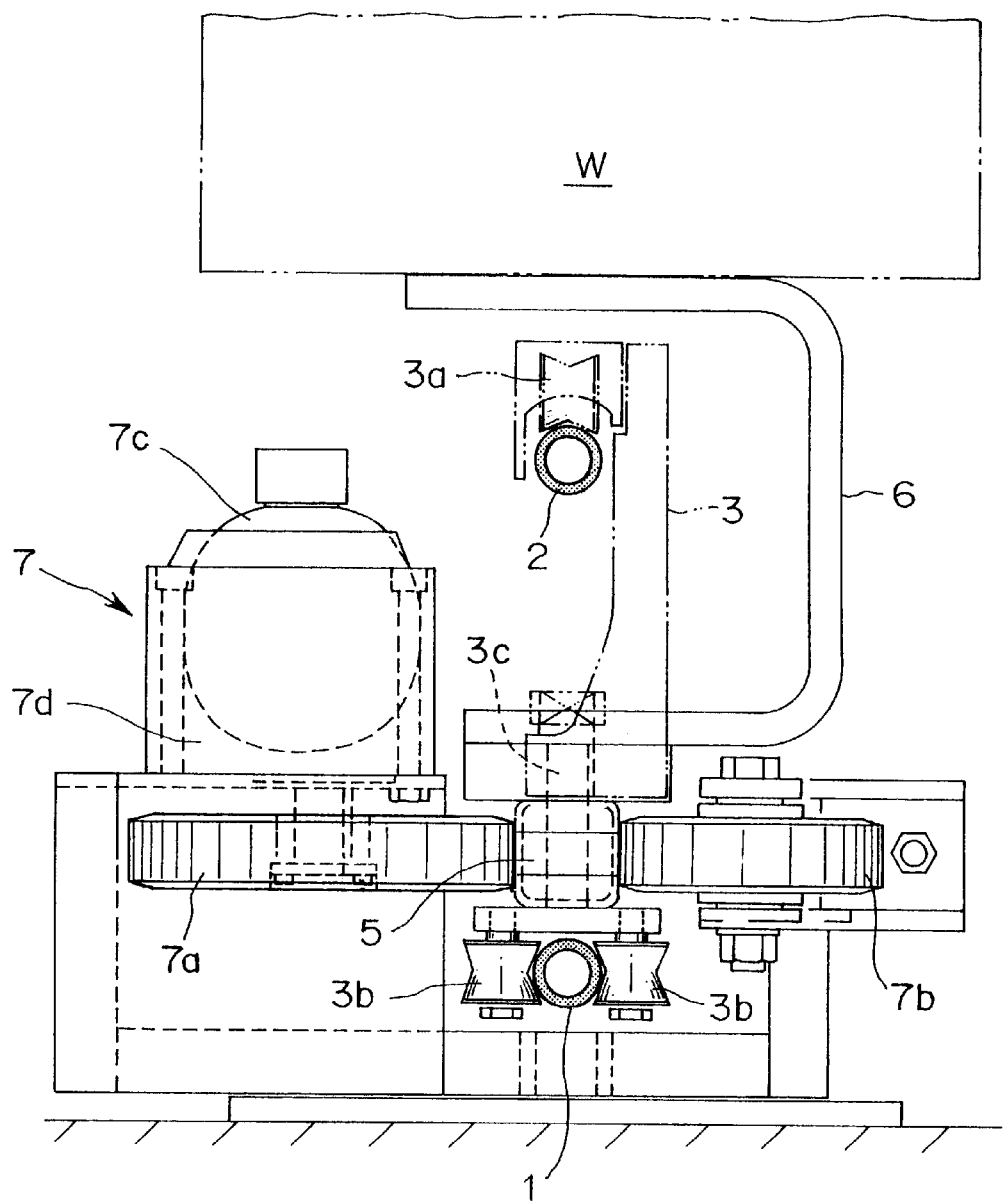
FIG. 4 is a sectional view taken on plane Y—Y in FIG. 2.

Carriage support brackets 6 are installed upright on the driven bars 5 as shown in FIG. 4. The brackets are disposed in space relation to one another, and support a carriage W, on which a conveyed article or material may be supported. The carriage support brackets 6 have a C-shaped cross-section to provide clearance for the tubular support rail 2.

In general, a friction drive system floor conveyor is built so that the entire conveyor is exposed on the conveyor floor to facilitate maintenance work. However, it is possible to adopt a double flooring structure wherein the friction drive system is located below an upper floor, and only the upper parts of the carriage support brackets 6 are exposed above the upper floor.

Friction drive mechanisms 7 are disposed at intervals along the conveyor line to engage and move the driven bars 5. As shown in FIG. 4, a friction drive mechanism 7 engages the driven bar 5 on both sides, and moves the driven bar in the conveying direction. As shown in FIG. 4, the side faces of the driven bar 5 are flat, and the surfaces of the drive mechanism which engage the driven bar are in the form of circular cylinders. Accordingly the driving mechanism engages the bar along lines of contact for efficient transmission of power.

As shown in FIG. 4, the friction drive mechanism 7 is composed of a friction roller 7a that engages one side of the driven bar 5 to drive the bar in the conveying direction, and a passive roller 7b that contacts the opposite side of the bar for additional guidance, and for the purpose of avoiding loss of conveying force by reducing slippage between the roller 7a and the bar, thereby achieving efficient operation. The friction roller 7a is driven by motor 7c through reduction gearing 7d.

The passive roller 7b is preferably provided with a vibration absorbing mechanism (not shown) to prevent the loosening and falling off of fasteners such as bolts and nuts used to secure the various parts of the conveyor together. The vibration absorbing mechanism flexibly absorbs rolling vibrations likely to be generated in the carriage W when loaded. The vibration absorbing mechanism can comprise an L-shaped lever having the passive roller mounted at one end. The L-shaped lever (not shown) is pivoted at its opposite end for swinging movement about a vertical axis, and is furnished with an elastic spring which urges the passive roller 7b against the side of the driven bar 5.

The friction drive floor conveyor described above is able to convey a carriage, heavily loaded with material or articles such as automobile assembly parts, with low production of noise and in a stable manner without creating a pitching or rolling movement. Moreover, it has the advantage of structural simplicity.

Since the guide rollers 3b are disposed at the lower part of the J-shaped carrier 3 and engage the guide rail 1, even in the case in which the conveyed material or article is very heavy and has a high center of gravity, the conveyor is able to withstand large moments exerted left or right in the roll direction, and maintain the J-shaped carriers in an upright attitude. Stable conveying without roll can be achieved even when large moments due to inertia of the carriage W and its contents are exerted as the carriage is moving around a corner in the conveyor path.

Also, in conveyors in which the conveyed material or article is very heavy and has a high center of gravity, the vertical spacing between the guide rail and the support rail can be made large in order to withstand moments exerted in the roll direction. Conversely, in conveyors in which the conveyed material or articles are relative light in weight, the vertical spacing between the guide rail and the support rail can be made relatively small, thereby reducing the overall height of the conveyor and reducing the labor required to load and unload the conveyor.

The principal advantages of the conveyor in accordance with the invention may be summarized as follows.

First, the use of tubular guide and support rails allows the rollers on the inverted J-shaped carriers to roll smoothly, with a substantial reduction in noise. Moreover, the tubular rails, being hollow, are light in weight, yet strong, and can be bent easily to accommodate any desired floor layout.

Secondly, since the guide rollers on the inverted J-shaped carriers cooperate with a guide rail at a location underneath the driven bar, the conveyor is able to maintain the carriers upright even when the conveyed material or article is very heavy and has a high center of gravity and is subjected to a moment in the roll direction, for example as a result of forces due to inertia when the load is moving in a curved path.

Third, since the driven bars are suspended at their ends on the carriers, and are in articulating, end-to-end relationship with one another, they form chords relative to the tubular rails as they traverse a corner of the conveyor path, and are therefore able to carry a heavy load around a corner smoothly and without roll. If a friction drive means is located at a corner in the conveyor line, it may be mounted to swing left and right to accommodate the motion of the driven bars as they traverse the arc of the support and guide rails.

Fourth, since the inverted J-shaped carriers are disposed at the ends of the driven bars, it is possible to construct the conveyor by selecting driven bars of suitable lengths and selecting corresponding intervals between the successive carriers, depending on the nature of the conveyed articles or material, and thereby achieve optimum carrying capacity while avoiding interference between successive carriages in the conveyor line.

Finally, by the use of a friction roller and a passive roller disposed on opposite sides of the driven bar, the friction roller can impart a driving force to the bar with low slippage, thereby ensuring that the drive mechanism will drive the conveyor reliably, and reducing motor power requirements.

The invention being thus described, it will be apparent that the same may be varied in many ways. Such variations are not to be regarded as a departure from the spirit and scope of the invention, and all such modifications as would be obvious to one skilled in the art, when armed with the foregoing description, are intended to be included within the scope of the following claims.

What is claimed is:

1. A friction drive system floor conveyor comprising:
    a tubular guide rail laid along a conveyor line, the guide rail having left and right sides;
    a tubular support rail disposed directly above the guide rail and in parallel relation therewith, the tubular support rail having an upper side;
    multiple, inverted, J-shaped carriers disposed at intervals along the conveyor line, each having an upper end with a support roller freely pivoted thereon and arranged to roll on the upper side of the tubular support rail, a lower end with a pair of guide rollers freely pivoted thereon and arranged to embrace the guide rail respectively on the left and right sides thereof, and a base;
    a driven bar linking each inverted J-shaped carrier with a next inverted J-shaped carrier in the conveyor, the driven bar being connected to the bases of the carriers which it links, and being disposed at a level between the tubular guide rail and the tubular support rail;
    a carriage support bracket disposed on, and extending upward from each driven bar, the carriage support bracket supporting a carriage above a floor on which the conveyor is situated; and
    friction drive means disposed along the conveyor line, the friction drive means frictionally engaging the driven bars on both sides thereof and imparting a conveying force thereto for moving the bars in a conveying direction along the guide and support rails.

2. A friction drive system floor conveyor according to claim 1, wherein the friction drive means comprises a power-driven friction roller engaging the driven bar on one side thereof to move the driven bar in the conveying direction, and a passive roller that engages the opposite side of the driven bar to guide the driven bar in the conveying direction.

3. A friction drive system floor conveyor according to claim 1, wherein both side faces of the driven bar are flat and the friction drive means has faces engaging the side faces of the driven bar, said faces of the friction drive means being circular, cylindrical faces engaging the faces of the driven bar along lines of contact.

* * * * *